United States Patent
Juneja et al.

(10) Patent No.: US 9,469,247 B2
(45) Date of Patent: Oct. 18, 2016

(54) USING EXTERNAL SOUNDS TO ALERT VEHICLE OCCUPANTS OF EXTERNAL EVENTS AND MASK IN-CAR CONVERSATIONS

(71) Applicant: Harman International Industries, Incorporated, Stamford, CT (US)

(72) Inventors: Ajay Juneja, Mountain View, CA (US); Stefan Marti, Oakland, CA (US); Davide Di Censo, San Mateo, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 64 days.

(21) Appl. No.: 14/086,828

(22) Filed: Nov. 21, 2013

(65) Prior Publication Data
US 2015/0137998 A1    May 21, 2015

(51) Int. Cl.
*G08G 1/00* (2006.01)
*B60Q 1/00* (2006.01)
*H04B 1/00* (2006.01)
*H03G 3/20* (2006.01)
(Continued)

(52) U.S. Cl.
CPC ............ *B60Q 9/00* (2013.01); *G10K 11/175* (2013.01); *G10K 15/02* (2013.01); *H04K 3/45* (2013.01); *H04K 3/46* (2013.01); *H04K 3/825* (2013.01); *H04K 3/41* (2013.01); *H04K 3/43* (2013.01); *H04K 2203/12* (2013.01); *H04K 2203/22* (2013.01)

(58) Field of Classification Search
CPC ....................................................... B60Q 9/00
See application file for complete search history.

(56) References Cited

U.S. PATENT DOCUMENTS

| 5,647,011 A | 7/1997 | Garvis |
| 6,360,187 B1 * | 3/2002 | Hermann ........... G01C 21/3629 340/460 |

(Continued)

FOREIGN PATENT DOCUMENTS

| JP | 08002339 A | 1/1996 |
| WO | 00/74013 A1 | 12/2000 |
| WO | 2012097150 A1 | 7/2012 |

OTHER PUBLICATIONS

European Search Report dated Nov. 16, 2015 in Application No. 15173228.6-1910.

(Continued)

*Primary Examiner* — Jennifer Mehmood
*Assistant Examiner* — John Mortell
(74) *Attorney, Agent, or Firm* — Artegis Law Group, LLP

(57) ABSTRACT

An audio processing system may selectively identify certain environmental sounds and playing back these sounds, or a representation of these sounds, in the vehicle's cabin. The audio processing system may filter the environmental sounds to identify a particular sound that matches an event such as a bouncing ball, squealing tires, footsteps, and the like. The audio processing system may then provide an audio alert to an occupant in the vehicle. For example, the system may process the identified sound (e.g., amplify and/or isolate the sound) and use a speaker to output the processed sound into the interior of the vehicle. In another embodiment, the audio processing system may use environmental sounds as an audio masking sound for creating privacy zones within the vehicle. The audio processing system may filter the environmental sounds to identify a continuous sound which is then output to generate the privacy zones.

13 Claims, 5 Drawing Sheets

(51) Int. Cl.
    *G01D 18/00*     (2006.01)
    *B60Q 9/00*     (2006.01)
    *G10K 15/02*     (2006.01)
    *G10K 11/175*     (2006.01)
    *H04K 3/00*     (2006.01)

(56) References Cited

U.S. PATENT DOCUMENTS

| | | | |
|---|---|---|---|
| 7,986,791 | B2 | 7/2011 | Bostick et al. |
| 8,068,025 | B2 | 11/2011 | Devenyi et al. |
| 8,126,159 | B2 | 2/2012 | Goose et al. |
| 8,194,865 | B2 | 6/2012 | Goldstein et al. |
| 8,868,137 | B2 | 10/2014 | Hicks, III |
| 9,041,545 | B2 | 5/2015 | Zelepugas |
| 2001/0046304 | A1 | 11/2001 | Rast |
| 2004/0179694 | A1 | 9/2004 | Alley |
| 2007/0116316 | A1 | 5/2007 | Goldberg |
| 2010/0033313 | A1* | 2/2010 | Keady .................. G08G 1/0965 340/438 |
| 2010/0329488 | A1* | 12/2010 | Holub .................... H04R 27/00 381/301 |
| 2013/0170662 | A1 | 7/2013 | Koga et al. |
| 2014/0044269 | A1 | 2/2014 | Anderson |
| 2014/0064511 | A1 | 3/2014 | Desai |
| 2014/0185828 | A1 | 7/2014 | Helbling |
| 2015/0137498 | A1 | 5/2015 | Klassy |
| 2015/0137998 | A1 | 5/2015 | Marti et al. |
| 2015/0222977 | A1 | 8/2015 | Angel, Jr. |

OTHER PUBLICATIONS

Non-Final Office Action dated Oct. 5, 2015, for U.S. Appl. No. 14/312,914.

European Search Report Application No. 14-19 2669.1, dated Oct. 28, 2015; 2 pages.

* cited by examiner

USING EXTERNAL SOUNDS TO ALERT VEHICLE OCCUPANTS OF EXTERNAL EVENTS AND MASK IN-CAR CONVERSATIONS

BACKGROUND

Many vehicle manufactures design their vehicles such that environmental noise (e.g., road noise) is dampened before reaching the cabin (i.e., the vehicle's interior). To dampen or prevent external environmental noise from reaching the cabin, a vehicle may use passive techniques (e.g., noise dampening materials and designs) and/or active techniques (e.g., noise cancellation system, active noise control, and the like). In fact, many manufactures advertise the quite ride of their vehicles provided by using the passive and/or active techniques for reducing cabin noise.

Reducing cabin noise, however, is not selective. That is, the passive or active techniques attenuate the various environmental audio indiscriminately. Sounds that the driver or passengers may want to hear are attenuated just as much as sounds that the occupants do not want to hear. Accordingly, reducing cabin noise by attenuating all environmental sounds may have a detrimental effect on an occupant's driving experience.

SUMMARY

One embodiment of the present disclosure includes a vehicular audio system comprising an audio detector configured to sense ambient noise external to a vehicle. The system also includes an audio processing module configured to receive one or more signals representing the ambient noise from the audio detector and filter the ambient noise to identify an event corresponding to at least one sound within the ambient noise. Furthermore, the at least one sound is generated by the event. The audio processing module provides an alert associated with the event to an occupant of the vehicle.

Another embodiment of the present disclosure includes a method for processing ambient noises external to a vehicle. The method includes receiving one or more signals representing the ambient noise and filtering the ambient noise to identify an event corresponding to at least one sound within the ambient noise. Furthermore, the at least one sound is generated by the event. The method also includes modifying at least one auditory characteristic of the at least one sound to enhance the ability of an occupant in the vehicle to identify the event associated with the at least one sound. The modified sound is then output on a speaker in an interior of the vehicle.

Another embodiment of the present disclosure includes a computer program product for processing ambient noises external to a vehicle. The computer program product includes computer-readable program code configure to receive one or more signals representing the ambient noise and filter the ambient noise to identify an event corresponding to at least one sound within the ambient noise. Upon determining an alerting mode is active, the program code provides an alert associated with the event using the speaker. The program code also filters the ambient noise to identify a continuous sound within the ambient noise and processes the continuous sound into a masking sound. Upon determining a masking mode is active, the program code provides the masking sound using the speaker to generate a privacy zone within the interior of the vehicle.

Figure 1:
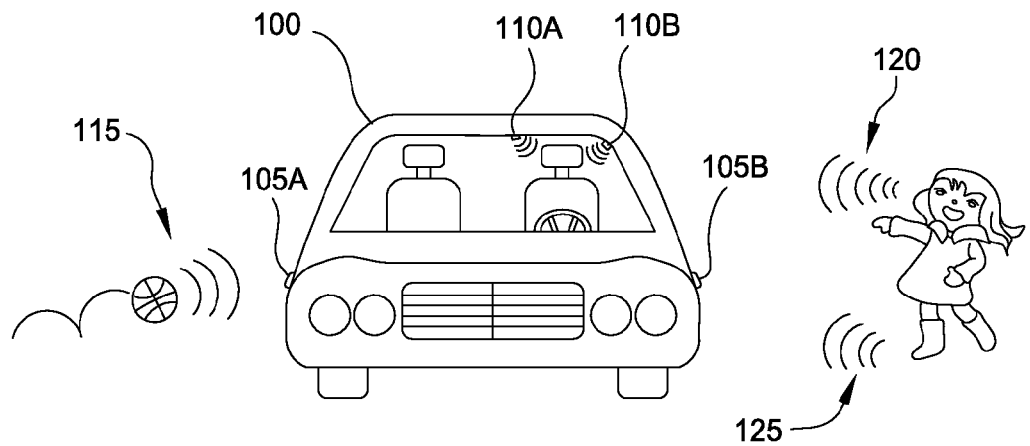
FIG. 1 illustrates a vehicle with an audio processing system for selectively identifying predefined environmental noises.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Although a goal of many car manufactures is to reduce the amount of environmental or external noise that penetrates into the interior of the vehicle, indiscriminately attenuating environmental sounds may interfere with the desired experience of a vehicle's occupant. Instead, the present disclosure includes techniques for selectively identifying certain environmental sound and playing back these sounds, or a representation of these sounds, in the vehicle's cabin. In one embodiment, a vehicle audio processing system may filter the environmental sounds to identify a particular external sound that matches an event such as a bouncing ball, squealing tires, footsteps, and the like. The audio processing system may then provide an audio alert to an occupant in the vehicle. For example, the system may process the identified sound (e.g., amplify and/or isolate the sound from other environmental sounds) and use a speaker to output the processed sound into the interior of the vehicle. In another example, the audio processing system may provide a spoken warning (e.g., "a child is playing near the right side of the car") or an audio warning (e.g., beeps or a siren). In this manner, the audio processing system may selectively identify which environmental sounds are relevant to the vehicle's occupant and provide an audio alert to the occupant.

In another embodiment, the audio processing system may use environmental sounds as an audio masking sound for creating privacy zones within the vehicle. For example, an occupant in the rear of the vehicle may desire privacy when talking on the phone or when speaking to another occupant. To prevent the driver from being able to hear the other occupant's conversation, the audio processing system may identify a continuous sound within the environmental sound surrounding the vehicle. A "continuous sound" is any repetitive or consistent sound that is suitable for masking purposes. Identifying continuous sound from the environmental sound may be better than simply generating artificial white noise or by rolling down a window. For example, white noise may not work where the occupant (e.g., the driver) is close to the speaker outputting the sound and rolling down the window exposes the cabin to the external weather. Instead, the audio processing system may filter the environmental sounds to identify a continuous sound—e.g., the wind rushing past the car, weather elements such as rain, engine noise, tire noise, sounds from nearby cars, and the like—and output the continuous sound at a level and/or controlled directionality that prevents one occupant from being able to hear the conversation of another occupant.

FIG. 1 illustrates a vehicle 100 with an audio processing system for selectively identifying predefined environmental sounds. As shown, vehicle 100 includes one or more audio detectors 105 (e.g., microphones, transducers, and the like) and one or more speakers 110. If multiple audio detectors 105 are used, they may be placed at different locations on the vehicle 100 (e.g., respective sides of the vehicle, under the vehicle, top of the vehicle, within the engine, and the like). Although the audio detectors 105A and 105B are shown on the exterior surface of vehicle 100, this is not a requirement. In other examples, the audio detectors 105 may be recessed such that they are not viewable—e.g., within the engine compartment or between a door and the frame of the vehicle. Regardless of the particular position chosen, the audio detectors 105 may be arranged to detect ambient sounds originating from events external to the vehicle. An external event may be single event (e.g., squealing brakes or a yell), a periodic or an intermittent event (e.g., footsteps, human conversation, a bouncing ball, etc.), or a continuous event (e.g., rain, wind, a running engine, etc.). Additionally, the audio processing system may detect events that occur within the vehicle itself. For example, the audio detector 105 may sense a sound generated when there is a problem with the vehicle's engine or a flat tire. As such, the sound (or sounds) associated with the event originate at the event, or are generated by the event, rather than being a reflected acoustic signal (e.g., a signal used when performing ultrasonic range finding) where the acoustic signal is generated at a different location than the event the signal detects.

The audio processing system may evaluate the different sounds or noise detected by the audio detectors 105 in order to identify events associated with the sounds. Non-limiting examples of environmental sound associated with these events includes people speaking, such as a group of pedestrians approaching a pedestrian crossing, a police officer or construction worker who regulates the traffic giving a command, the acoustic signal (e.g., beeping) from a pedestrian crossing traffic light, sound emitting from bikes or balls, weather events such as hail, lightning, wind or rain, and the like. As shown here, the audio detectors 105A may detect the sound of a bouncing ball 115, a child's voice 120, and footsteps 125. Each of these sounds 115, 120, 125 may have different characteristics that the audio processing system can correlate to a specific event. The audio processing system may evaluate the frequency of the sounds, periodic patterns within the sound, identify speech, and the like in order to correlate the sounds 115, 120, and 125 to respective events. In this manner, the audio processing system assigns a specific event to the sounds—e.g., that sound 115 is a bouncing ball or sounds 125 are footsteps—and/or categorizes the sounds as a single, periodic, or continuous sounds. As such, the sound (or sounds) associated with the event originate at the event, or are generated by the event, rather than being a reflected acoustic signal (e.g., a signal used when performing ultrasonic range finding) where the acoustic signal is generated at a different location than the event the signal detects.

The audio detectors 105 may be placed in different locations in order to determine a direction of the sound event from the vehicle 100. For example, both audio detectors 105A and 105B may sense the sound of the footsteps 125. However, because audio detector 105B is closer to the event than audio detector 105A, the sound sensed by detector 105B may have a greater amplitude than the sound sensed by detector 105A. In addition, the sound sensed by detector 105A may arrive later than the sound sensed by detector 105B. As such, the audio processing system may determine that the child making the footsteps (i.e., the sound event) is likely on the right-side of the vehicle 100 (relative to the view shown in FIG. 1). In addition to direction, the sound sensing system may compare sounds sensed by at least one of the audio detectors 105 to estimate the distance from a sound event to the vehicle 100. For example, if the footsteps becomes increasingly louder (i.e., the amplitude of the detected sound increases), the audio processing system may determine that the sound event is approaching the vehicle 100. Using multiple audio detectors 105, the audio processing system may estimate the distance of the sound event relative to the vehicle 100. That is, by determining at what time the sound from a particular sound event reaches the respective audio detectors 105, the audio processing system may identify the distance from the detectors 105 and the sound event. To do so, the audio processing system may use any suitable acoustic range finding technique.

After processing or isolating the various environmental sounds, the audio processing system may identify one or more relevant sounds—i.e., sounds deemed relevant to the occupant. For example, the audio processing system may deem the sound of the bouncing ball 115 as being relevant to the occupant while a bird chirping is not. The processing system may then use the speakers 110A and 110B to provide an audio output that corresponds to the relevant sound. For example, the audio processing system may transmit an amplified version of the bouncing ball sound 115 which alerts a vehicle's occupant to look out for a ball. In other embodiments, the system may also provide a directional indicator of the sound and/or a distance from the vehicle 100 to the sound event. For example, the system may provide an audio warning that there is a child playing ten feet away on the driver's side of the vehicle.

In another embodiment, the audio processing system may filter through the ambient sounds to identify a continuous sound that is suitable as a masking sound. For example, the repetitive or consistent sound that the vehicle's tires make rubbing on the road may be identified by the audio processing system which, after processing, plays back the processed sound using the speakers 110. The audio processing system may adjust the amplitude of the continuous sound such that one occupant of the vehicle 100 (e.g., the driver) cannot hear the conversation of another occupant in the vehicle. In this manner, the system may generate privacy zones in the vehicle 100 may using the continuous sounds identified from the environmental sounds sensed by the audio detectors 105. In addition, the privacy zones may also be used to mitigate distractions to an occupant. If, for example, a driver does not want the sounds made by other occupants to harm his ability to concentrate, the driver may activate a privacy zone which creates a distraction-free zone where the sounds may by other occupants are drowned out by the masking sound.

The speakers 110 may be arranged anywhere in the vehicle 100 such that their audio output is heard by occupants within the vehicle 100. Accordingly, the speakers 110 may be visible to the occupants (e.g., incorporated into in-ear speakers, headphones, or mounted on a headrest, roof, side panel, or) or invisible to the occupants (e.g., embedded in a dash or within a seat). Moreover, the audio processing system may use the same speakers used by the vehicle's audio system (e.g., a radio, CD player, DVD player, etc.) which may reduce the cost of implementing the audio processing system. In one embodiment, the speakers 110 are specifically designed to provide audio output to one of the occupants (e.g., the driver). For example, if the audio processing system uses the speakers 110 to provide processed sounds that correspond to relevant events, the speakers 110 may be arranged such that the driver is guaranteed to hear these sounds so she can take preventative action to prevent harm to the vehicle 100, its occupants, and objects/humans in the environment. Similarly, if the system is configured to provide masking sounds based on detected continuous sounds, the speakers 110 may be arranged to form privacy zones for one or more occupants in the vehicle 100. Nonetheless, the speakers 110 may also provide the audio alerts or the masking sounds to other occupants in the vehicle.

The speakers 110 may provide directional information to the occupant without a specific spoken prompt. That is, if the event occurs at the rear of the vehicle 100, the speakers 110 may provide the sound such that the occupant perceives the sound as originating from the rear of the vehicle. To do so, the speakers 110 may be arranged in a specific way and/or use a directional audio technique (e.g., 3D sound) in order to convey directional information to the occupant when playing back the processed versions of the external sounds.

The audio processing module may also convey to the occupant the distance from the vehicle to the event when playing back the associated with the event. For example, as the event moves closer to the vehicle, the module may increase the volume of the sound being played back. Moreover, the audio processing module may use the volume of the played back sound to indicate an importance of the event. That is, even though a sound associated with a first event may be louder than a sound associated with a second event, the audio processing module may artificially emphasize the second event by either not playing back the sound from the first event or processing the sounds such that the sound of the second event is louder than the processed sound of the first event when output into the vehicle's interior. For example, the first event may be a dog barking on the other side of the street which may be louder than a bicyclist approaching the rear of the vehicle (the second event). Because the second event may have a greater importance than the first—e.g., the bicyclist may be closer to the vehicle than the dog—the audio processing module may emphasize the sound of the second event and de-emphasize the sound of the first event. To prioritize the events, the audio processing module may use any number of factors such as the type of the event, distance of the event from the vehicle, direction of the event, movement of the event, and the like.

Figure 2:
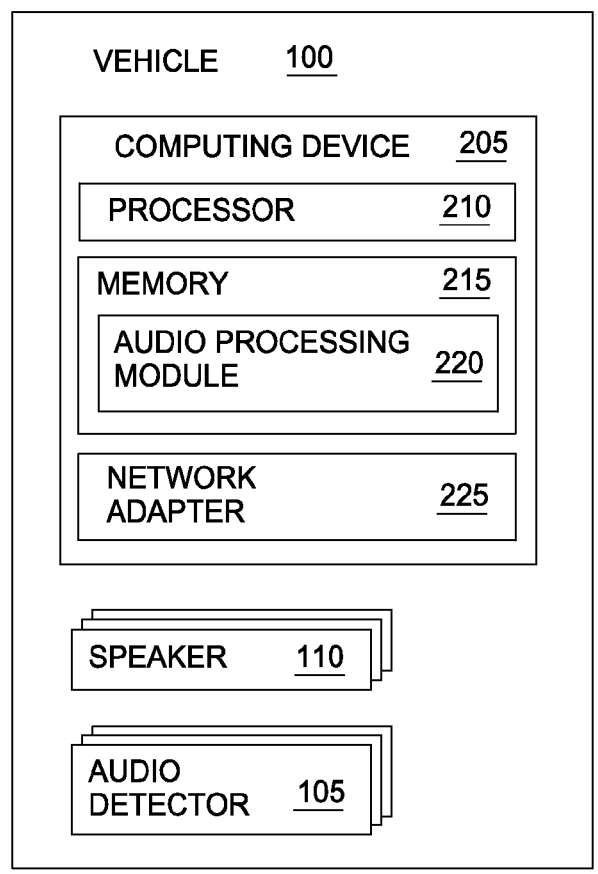
FIG. 2 illustrates a system for identifying external sounds events.

FIG. 2 illustrates a system for identifying external sounds events and providing a corresponding audio output. The vehicle 100 includes a computing device 205 as well as at least one speaker 110 and audio detector 105. The computing device 205 includes a processor 210 which may be a general purpose processor or a specialized processing element (e.g., an ASIC) capable of performing the functions described in this disclosure. The computing device 205 also includes a memory 215 which may include volatile memory, non-volatile memory, or both. Examples include RAM, Flash memory, hard disk, cache, and the like. The memory 215 includes an audio processing module 220 which may receive the environmental sounds sensed by the audio detectors 105 and, based on identified sounds, provide an audio output to an occupant within the vehicle 100 using speakers 110. The audio processing module 220 may be a software application, firmware, hardware, or some mixture thereof. The logic that may be performed by the audio processing module 220 will be described below.

The computing device 205 also includes a network adapter 225 which enables the computing device 205 to communicate with a network. For example, the network adapter 225 may enable the computing device 205 to connect to the Internet using a WiFi, cellular, or Bluetooth® connection (Bluetooth is a trademark owned by the Bluetooth Special Interest Group). As will be discussed in greater detail below, the audio processing module 220 may use the network adapter to receive updates or provide information that may be useful to other audio processing module 220 when providing alerts or masking sounds to occupants in a vehicle.

Providing an Audio Alert to an Occupant

Figure 3:
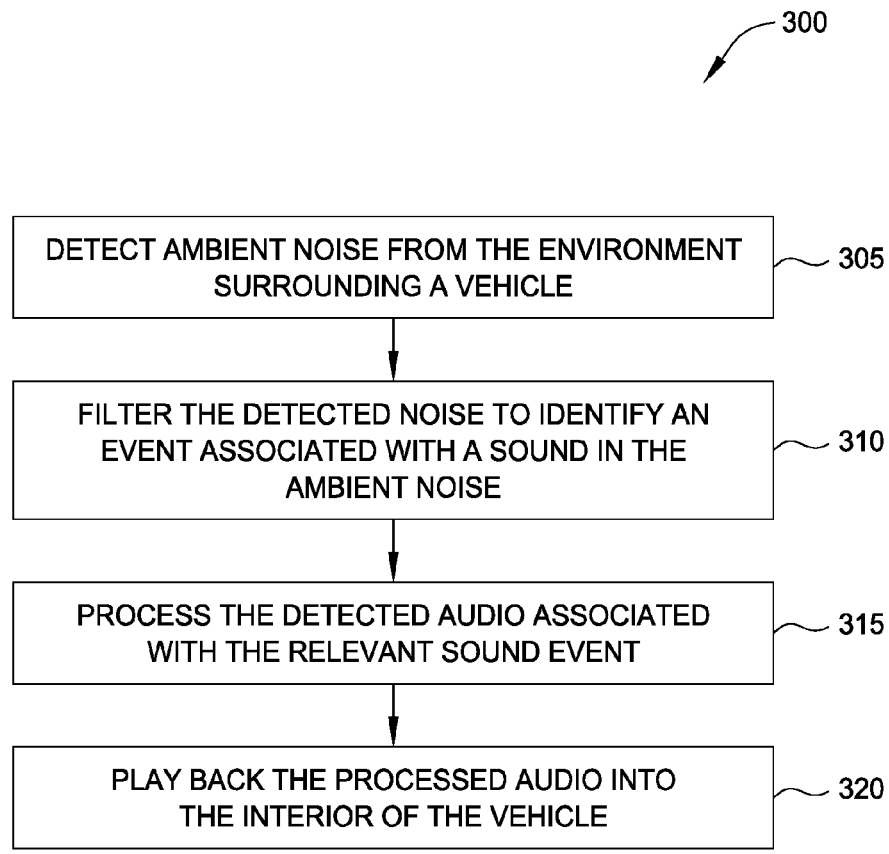
FIG. 3 is a flowchart for using an identified sound to alert a vehicle's occupant of an external event.

FIG. 3 is a flowchart of method 300 for using an identified sound to alert a vehicle's occupant of an event. In this case, the audio processing module evaluates the ambient sounds received by the audio detectors to determine whether an audio alert should be provided to an occupant of the vehicle. At block 305, the audio detectors (e.g., microphones) mounted on the vehicle detect ambient sounds from the environment surrounding the vehicle. This raw data may include a mixture of different environmental sounds. To identify sounds of interest or relevant sounds, at block 310, the audio processing module filters the detected audio to isolate and evaluate the various sounds. For example, the ambient sounds may include sounds resulting from weather conditions (e.g., rain), engine noise, a child playing near the car, animals, and the like. The audio processing module may evaluate the ambient sounds to filter and identify a particular sound of the various sounds in the ambient sounds. Generally, the audio processing module may perform auditory scene recognition in order to associate a particular event with a particular sound in the ambient sounds.

In one embodiment, the audio processing system may determine if one sound matches a predefined sound. For example, the audio processing module may evaluate the characteristics of the ambient sounds (frequency, amplitude, repetitive patterns, etc.) to identify a particular sound within the audio. A basketball bouncing on pavement may generate a sound with different characteristics than a bird chirping or a moving bicycle. By identifying the characteristics of the sounds within the ambient sounds, the audio processing module may then compare those characteristics with characteristics of known events. If the detected characteristics match the known characteristics, the audio processing module may identify the events associated with the different sounds—e.g., a bouncing basketball, a chirping bird, moving bicycles, etc.

In one embodiment, the predefined characteristics of the events may be stored in the memory of the computing device discussed in FIG. 2. For example, the characteristics may be stored in a database or table which the audio processing module then accesses to match the detected characteristics to the characteristics stored in the memory. The characteristics may match if they are similar to the characteristics stored in the memory. To determine if the characteristics of the detected sounds are similar to the characteristics of the known sounds, the audio processing module may use one or more thresholds or matching criteria. That is, because the sound of a basketball bouncing will vary depending on the specific surface of the street, amount of air in the ball, the material of the ball, etc., the audio processing system may use the thresholds or matching criteria to determine if the measured characteristics are close enough to the predefined characteristics to assert that the detected sound is indeed a basketball bouncing. The threshold and criteria could be the specific frequency spectrum of an event or audio fingerprinting criteria that analyzes energy peaks in time-frequency domain. In another example, the audio processing module may include a voice recognition application for detecting human voices. If the application identifies a human voice (e.g., a child laughing), then the audio processing module may deem the associated sound as a relevant event.

In this manner, the audio processing module may evaluate the various sounds in the ambient sounds to identify the sources of the sound (i.e., an event associated with the sounds). In one embodiment, the audio processing module may assign a weight to the identified events. That is, the audio processing module may assign an importance to each of the predefined events such that they can be compared. For example, a bouncing ball may have a different weight than a child near the vehicle. The weights associated with the events may be predefined. However, in one embodiment, the audio processing module may alter the weight based on a distance or direction of the event relative to the vehicle. Initially, a weight associated with a child may be higher than the weight associated with a bouncing ball; however, if the child is much further from the vehicle than the ball, the audio processing system may change the weights such that the weight associated with the child is now less than the weight associated with the ball. Similarly, the audio processing system may be aware of the vehicle's current or future direction. If the vehicle is backing up or in reverse, the audio processing module may increase the weight associated with events occurring in the rear of the vehicle. In one embodiment, the audio processing module uses the weights to select which sound to playback in the interior of the vehicle. However, this is not a requirement as the audio processing module may playback each of the sounds that are associated with a plurality of identified events.

The audio processing module may also use the weight to determine if the event is relevant to the vehicle's occupant. For example, the audio processing module may identify an event from the ambient sounds but the event may be far away from the vehicle (e.g., sirens in the distance). Accordingly, the audio processing module may adjust the weight associated with an event based on its estimated distance from the vehicle. If the weight does not meet a predefined minimum value, the audio processing module may deem the event as not relevant to the occupant and not play back its associated sounds as an alert. However, the audio processing module may continue to reevaluate the ambient sounds and increase the weight associated with the event as the source of the sound moves closer to the vehicle (e.g., the siren approaches the vehicle).

Of course, the factors described above may be used without weighting in order to prioritize the environmental sounds. That is, the audio processing module may consider individually or in combination the type of the event, distance of the event from the vehicle, speed at which the event is approaching the vehicle, direction of the event relative to the vehicle, and the like. Based on any one of these factors or a combination thereof, the audio processing module may selectively determine which of the events are relevant to the vehicle's occupant. For example, instead of weighting the events, the audio processing module may use the factors as thresholds. So long as an event meets the thresholds associated with one or more of the factors (e.g., the event is (1) within ten feet of the vehicle and is (2) moving closer to the vehicle) the processing module may deem the event as relevant to the vehicle's occupant.

At block 315, the audio processing module modifies a characteristic of the sound associated with an identified event before playing the sound in the interior of the vehicle. For example, the audio processing system may isolate or clean-up the sound associated with an event. Doing so may better enable the occupant to quickly identify the event (i.e., become aware of the event) and choose the appropriate reaction—e.g., braking, swerving, slowing down, looking in the direction of the event, etc. The audio processing system may process the sound to sharpen the sound, amplify the sound, change frequency distribution, and the like. For example, the audio processing system may identify that a nearby car is currently traveling in the vehicle's blind spot and amplify the sound of the vehicle in order to alert the driver of the car. In another example, the audio processing system may identify footsteps of a person near the car, but because the person may be walking on gravel or grass, the footsteps are muffled. As such, the audio processing module may sharpen the sound to make the sound associated with the footsteps more pronounced and identifiable to the occupant.

In one embodiment, the audio processing system may select a uniform, predetermined sound that represents the event. That is, the audio processing system may use the same sound to represent the event even if the sounds of the event are different. As explained earlier, the sound made by a bouncing basketball differs based on any number of factors. However, regardless of the actual sound made by the bouncing basketball, the audio processing system may use a pre-recorded sound associated with a bouncing ball rather than piping the actual detected sound of the basketball from the outside. Doing so provides the occupant with additional predictability since the sound associated with an event is always the same.

At block 320, the audio processing system plays back the selected audio (e.g., processed audio of the actual event or predetermined sound) into the interior of the vehicle using the speakers shown in FIGS. 1 and 2 as an alert to the occupant. In one embodiment, the audio processing module may output the sound from the speakers so the original direction of the event, relative to the vehicle, is preserved (e.g., left, right, front, rear, up, etc.). For example, the speakers may create a surround sound environment where the audio processing module may play back the selected audio using the speakers to correspond to the direction the original sound was sensed by the audio detectors at the exterior of the vehicle. Using the speakers to setup a surround sound environment is not necessary, however, to convey the relative direction of the event to the occupant. Instead, the audio processing module may use 3D audio effects that convey direction to an occupant using only one or two speakers. However, in other embodiments, the audio processing module may not convey direction of the event when playing back the audio alert to the occupant. For example, the audio processing module may use the speakers associated with a built-in radio or media player to play the selected audio to the occupants in the car without attempting to convey the direction of the event to the occupants.

In one embodiment, the system detects an external environment and recreates that environment inside the vehicle cabin in varying degrees. That is, selected aspects (e.g., selected sounds) of the external environment can be recreated with respect to frequency, amplitude, location, and the like. Moreover, the audio processing module may filter out the sounds that are not associated with relevant events (e.g., road noise or unidentifiable sounds). Alternatively, the external sound can be completely recreated thereby effecting a 3D extension of the external sound environment in the cabin.

In one embodiment, the audio processing module may play back the processed sound after receiving some indication from the occupant. For example, the module may not output the sound of a car in the vehicle's blind spot until the driver indicates that she wants to changes lanes, e.g., once the driver turns on her blinker.

Of course, the audio processing module may play back sounds that the occupant would be unable to hear even if a vehicle's door was open or a window was rolled down. For example, the audio processing module may detect a sound that is too attenuated for detection by human ears, even if the sounds were not dampened by the vehicle. In this case, the audio processing module may process the sound (e.g., amplify the soft sound) and play the artificially amplified sound using the speakers. In this manner, the audio processing module may alert the occupant of events she would otherwise be unable to detect, even if her window was rolled down or the door was open.

Although the embodiments above describe the alert as an auditory alert, it is not limited to such. Instead, the alert may be only a visual alert that may be displayed on heads-up-display or on one of the windows in the vehicle that warns an occupant about the event or describes the event.

In one embodiment, the audio processing module may be able to learn in order to improve its ability to identify relevant events. In one example, the occupant of the vehicle may provide feedback to the audio processing module when an event was identified but was either incorrectly categorized or not relevant to the occupant, or if an event relevant to the occupant occurred but was missed by the audio processing module. As an example of the formal situation, the audio processing module may mistake the sound from a dog barking repeatedly as a bouncing ball and play back the dog bark into the interior of the vehicle. The occupant may use a voice command or a user-interface element (a button or touchscreen) to inform the audio processing module that sound was not a bouncing ball. In response, the audio processing module may refine the thresholds or matching criteria associated with identifying the bouncing ball event to exclude a repetitive dog bark. Alternatively, the audio processing module may have correctly identified the event associated with a sensed sound but the event may not be relevant to the occupant, e.g., the module may have detected police siren but the occupant may prefer not to have those sounds played back into the car. Thus, the occupant may inform the audio processing module that these events are not relevant.

As an example of when the audio processing module may have missed an event, the occupant may notice a bicyclist approach the vehicle but the occupant may not hear the sound being played back through the speakers. As such, the occupant may use a user interface to instruct the audio processing module that the previous sound sensed by the audio detectors should have been played back into the interior of the vehicle. In response, the audio processing module may save the sound sensed by the audio detectors immediately before receiving the user's command (e.g., the last ten seconds of audio). The module may use the recorded sound to define a new event in memory and define thresholds for matching the saved sound to future sounds sensed by the audio detectors.

The audio processing module may also expand the number of relevant sounds by communicating with other audio processing modules either directly or indirectly. For example, the audio processing module may detect a sound immediately before the vehicle is in an accident. Although the audio processing module may not have been able to correlate the sound to any known event, the module may add an event based on the assumption that the sound was related to the accident. Using the network adapter, the audio processing module may upload the information regarding the event to other audio processing modules or to a central repository where other audio processing modules may download the event. In this manner, the audio processing module may learn from the experiences of other modules and expand its list of relevant events.

In one embodiment, the vehicle may include video cameras that provide images of the environment surrounding the car. In this case, the computing device may include a video processing module that works in tandem with the audio processing module to identify relevant events occurring in the environment. By combining the auditory and visual information, the system may be able to more accurately identify relevant events. In addition, the visual information may provide a more definitive direction and/or distance estimate of the event relative to the vehicle.

Figure 4:
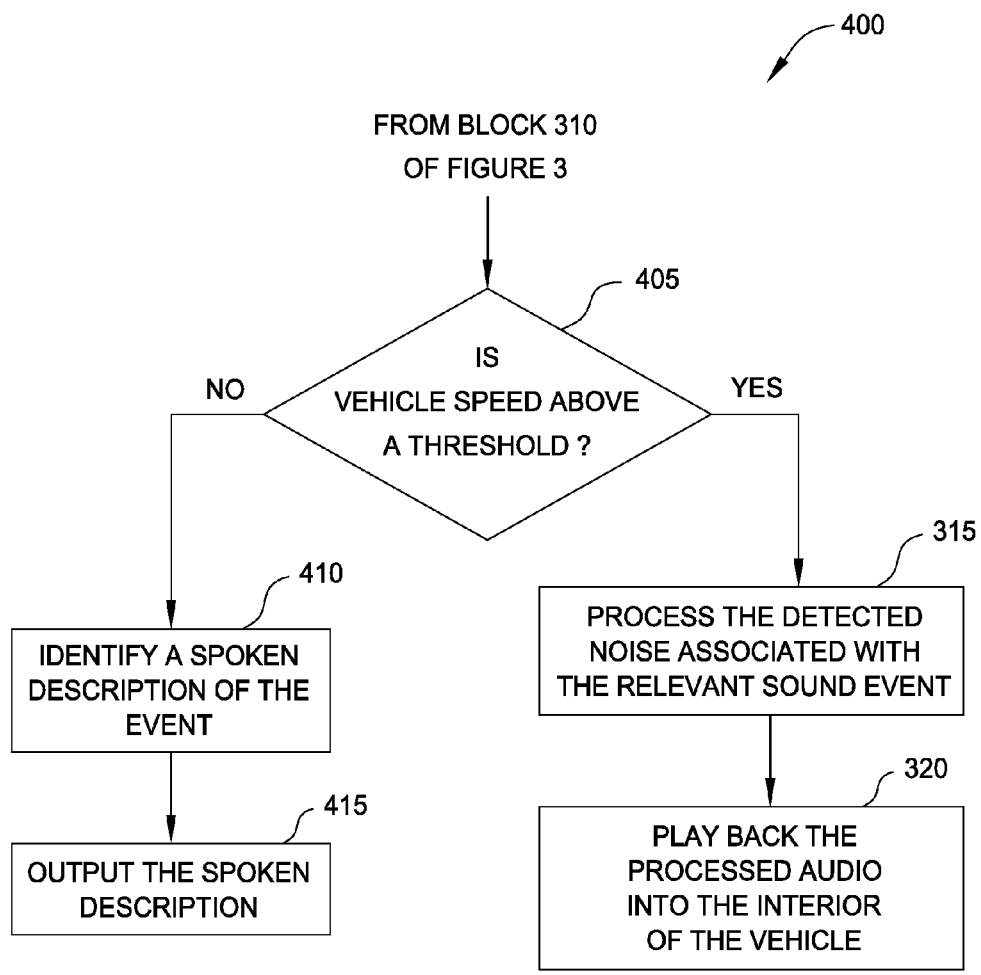
FIG. 4 is a flowchart for alerting a vehicle's occupant of an external event based on the speed of the vehicle.

FIG. 4 is a flowchart for alerting a vehicle's occupant of an external event based on the speed of the vehicle. In method 400, the audio processing module may alter the output audio based on the speed of the vehicle. Method 400 begins after block 310 of FIG. 3 where the audio processing module has identified at least one event by filtering the ambient sounds associated with the environment surrounding the vehicle. At block 405, the audio processing module determines whether the current speed or velocity of the vehicle exceeds a predefined threshold. For example, the audio processing module may be communicatively coupled to a computing device that monitors the speed of the vehicle. The audio processing module may query this computing device to determine if the vehicle speed is above or below the threshold.

If the speed is above the threshold, method 400 may proceed to block 315 and continue as explained above—e.g., the audio processing module plays back a processed version of the identified sound or a predetermined sound representing the event. However, if the vehicle speed is not above the threshold, at block 410, the audio processing module may identify a spoken description of the event. That is, instead of playing back the sound associated with the event, the audio processing module may output a description of the event using words—e.g., "A person is approaching the car" or "A moving bicycle is near the car." The speed threshold may be set such that audio processing module has time to provide the description of the event and the occupant has time to react. For example, audio processing module may use a spoken description of the event to alert the occupant if the vehicle is traveling at speeds less than 15 miles per hour. At these low speeds, the occupant may have enough time to process the spoken description and react to the event.

In one embodiment, the system may use other parameters besides speed to determine whether to provide a spoken description of the event or to provide the actual sound of the event. For example, the audio processing module may consider the speed of the event (e.g., the rate at which the event is approaching the vehicle), an estimate time of impact, or distance of the event from the vehicle. The audio processing module may compare a combination of these parameters (along with the speed of the vehicle) to predefined thresholds or just one or more of these parameters for determining when to provide either the spoken description or the actual sound to the occupant.

The spoken description may also include the distance or direction of the event relative to the vehicle. Moreover, the distance and direction estimates may be combined to identify a 3D point or location of the event relative to the vehicle. The direction could be relative to a side of the car (e.g., "A car is in the driver's side blind spot" or "An emergency vehicle is approaching from behind") or a cardinal direction ("A bicyclist is approaching from the North"). In addition, the description may include a speed associated with the event—e.g., "A child is running towards the vehicle" or "A bicyclist is approaching on the passenger side of the car at 10 miles per hour." The spoken description may also include a suggested action or command such as "A child is approaching, hit the brakes now!" or "Do not change lanes".

In one embodiment, the length of the spoken description may change depending on the speed of the vehicle or the speed associated with the event. For example, as the vehicle approaches the threshold, the audio processing module may shorten the descriptions so provide the user with additional time to react. For example, when the vehicle is stationary and a bouncing ball approaches the vehicle, the audio processing module may state "A ball is rolling towards the left side of the vehicle." When the vehicle is near the speed threshold of block 405, the module may only state that "A ball is rapidly approaching." Similarly, if the event is approaching the vehicle rapidly, the audio processing module may also shorten the audio description to provide the occupants more time to react. At block 415, the audio processing module outputs the identified description of the event using the speakers described above.

Although method 400 illustrates either playing back a sound associated with the event if the speed is above the threshold and outputting a spoken description is less than the threshold, in other embodiments, the audio processing module may do both. For example, even if the speed of the vehicle exceeds the threshold, the audio processing module may provide a brief description of the event when playing back the processed audio, or provide a processed version of the sound if the vehicle's speed is below the threshold. Doing so may enable the occupant to identify the event earlier, and thus, react quicker than if only one of the techniques for alerting the occupant was used.

Providing a Masking Sound to an Occupant

Figure 5:
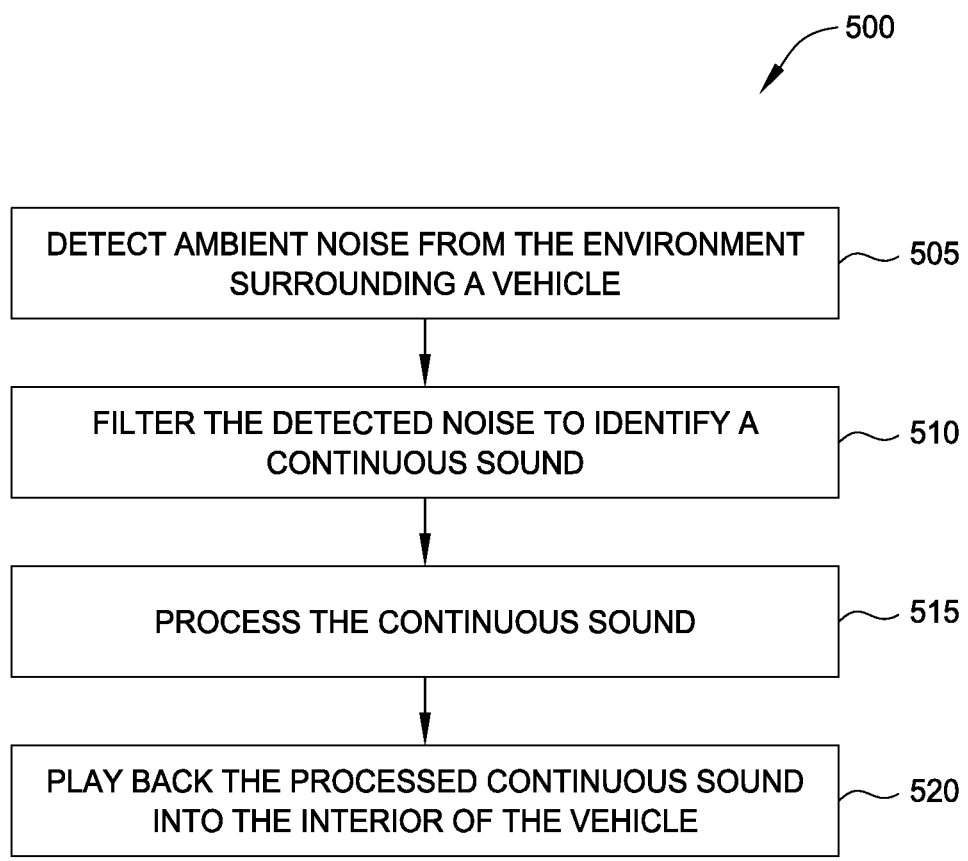
FIG. 5 is a flowchart for identifying and providing a continuous sound to a vehicle's occupant.

FIG. 5 is a flowchart for identifying and providing a continuous sound to a vehicle's occupant. Generally, method 500 identifies a continuous sound from the ambient sounds to provide a privacy zone (or a distraction-free zone) in the vehicle. The continuous sound may be used to create the privacy zones without the need of white noise generators or sound dampening barriers that physically separate parts of the interior. When white noise is output from speakers close to an occupant (e.g., within a few feet of the occupant), the effectiveness of the white noise for blocking other noise is reduced. Thus, in small spaces such as the interior of a vehicle, white noise generators may not be effective as, for example, using continuous sounds occurring naturally to create privacy zones. Sound dampening barriers, on the other hand, are expensive and may be cost prohibitive for many vehicles. Accordingly, using continuous sounds identified from the surrounding environment may be a more effective and add less cost to the vehicle than the previously discuss methods for creating privacy zones. Doing so may also be preferred over rolling down a window since this exposes the cabin to external weather.

At block 505, the audio detectors sense various sounds in the environment surrounding the vehicle. This raw data may include a mixture of different environmental sounds. At block 510, the audio processing module may filter the detected audio to isolate and evaluate the various sounds. For example, ambient sounds may include sounds resulting from weather conditions (e.g., rain), engine noise, a child playing near the car, animals, and the like. The audio processing module may evaluate the ambient sounds to filter and identify a particular sound of the various sounds in the ambient sounds. Specifically, in this embodiment, the audio processing module may search the ambient sounds for a continuous sound that is suitable as a masking sound. The audio processing module may then use the continuous sound to create one or more privacy zones.

The continuous sound may be any repetitive and/or constant sound that is suitable for masking other sounds. Examples of continuous sounds include rain, noise from tires and engines, wind, and the like. The audio processing module may monitor the ambient sounds to identify particular sounds with attributes that indicate the sound is a continuous sound—e.g., a repetitive pattern, constant amplitude, or the type of frequencies in the signal. If the sound matches these predefined attributes, the module may categorize the sound as a continuous sound.

At block 515, the audio processing system may process the continuous sound by, e.g., identifying a segment of the sound, changing the amplitude, sharpening the sound, and the like. For example, the audio processing system may increase the amplitude of some frequencies in the sound but reduce other frequencies to form a continuous sound that is more even which may make the sound more desirable as a masking sound. In one embodiment, the audio processing system may include microphones in the interior of the vehicle to sense sounds made by the occupants. The audio processing module may then change the amplitude in response to the sounds made by the occupants. For example, the audio processing module may use the interior microphones to process the continuous sound such that it will mask the conversation of the other occupants. Thus, even if the occupants in the back of the vehicle are having a loud conversation, the audio processing module can adaptively process the continuous sound to mask the conversation from an occupant in the front of the vehicle.

At block 520, the audio processing module plays back the processed, continuous sound. The audio processing module may, in one embodiment, continually sense the continuous sound from the environment, process the sound, and output the process sound as a masking sound. Alternatively, the module may identify a segment of the continuous sound (e.g., a ten second segment) which it then loops (repeats) to generate the masking sound. Thus, if the continuous sound stops—e.g., the rain fades or the vehicle stops—the audio processing module may still provide the masking sound. One advantage, however, of continually providing the environmental sound (rather than repeating a loop of the sound) is that the cognitive load will be lower the more the masking sound matches the sounds in the environment—i.e., the masking sound is more realistic to the occupant. Additionally, attempting to use the environmental sound may make the masking effect so subtle that the driver is not aware of its existence. This is more likely achievable if the masking sounds are actually from the real environment—i.e., in sync with what the occupant sees in the environments such as a gust of wind with rain striking the car. Moreover, using the environmental sounds may mix continuous sounds from the environment to generate the masking sound—i.e., the sound of rain as well as the sound of tires on the wet road—which make the masking sound more realistic.

In one embodiment, the audio processing module may be coupled to a user interface that receives verbal or physical commands from an occupant for activating the privacy zones. For example, when desiring privacy, an occupant in the back seat may activate the masking sound, e.g., using a button or voice command, which creates a privacy zone in the back seat. Of course, the same masking sound may be used to generate multiple privacy zones in the car. For example, front passenger seat may also be a privacy zone where the driver and any passengers in the back cannot hear the front passenger's conversation (and vice versa).

The speakers in the interior car may be arranged in any fashion in order to generate one or more privacy zones by outputting the masking sound. For example, the speakers may be located in a headrest, be earpieces worn by an occupant, or surround an occupant that is to be excluded from the conversation. Moreover, the audio processing system may be preconfigured or customized to generate a masking sound suitable for the particular arrangement of speakers in the vehicle. For example, the audio processing system may need to output a louder masking sound to generate a privacy zone for a passenger in the back seat if the speakers are in front of the driver than in the speakers were between the driver and the back seat passenger—e.g., in the driver's headrest. In this manner, the audio processing module may be configured to generate privacy zones for any number of different sound speaker arrangements.

Figure 6:
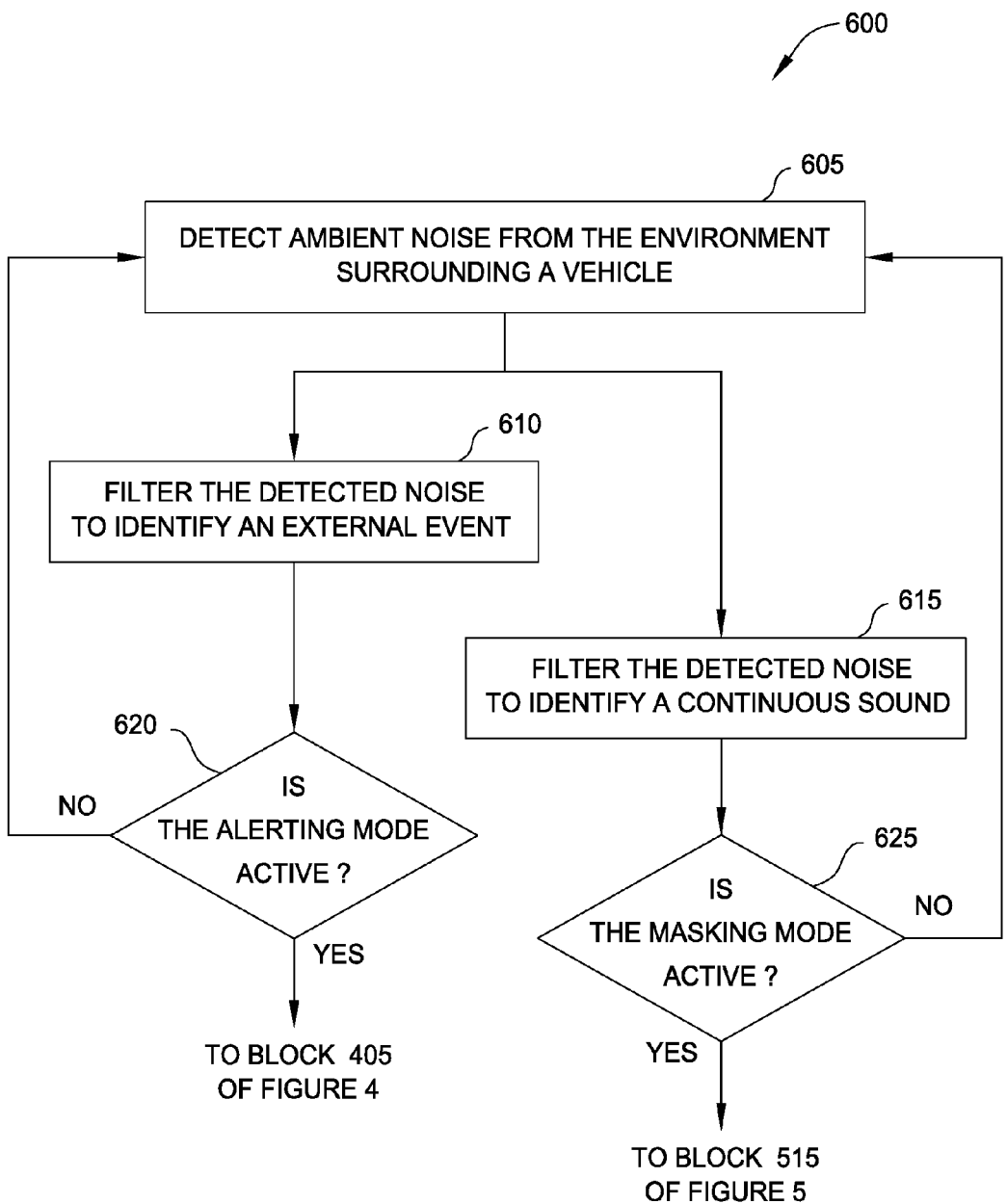
FIG. 6 is a flowchart for providing an alert and/or a masking sound to a vehicle's occupant.

FIG. 6 is a flowchart for providing an alert and/or a masking sound to a vehicle's occupant. Generally, method 600 illustrates examples of an audio processing module that may provide an alert to the user of an external event or a masking sound to generate one or more privacy zones within the vehicle. At block 605, the audio detectors (e.g., microphones) mounted on the vehicle detect ambient sounds from the environment surrounding the vehicle. This raw data may include a mixture of different environmental sounds. To identify sounds of interest or relevant sounds, at blocks 610 and 615, the audio processing module filters the detected audio to isolate and evaluate the various sounds. For example, ambient sounds may include sound resulting from weather conditions (e.g., rain), engine noise, a child playing near the car, animals, and the like. The audio processing module may evaluate the ambient sounds to filter and identify a particular sound of the various sounds in the environment.

At block 610, the audio processing module may perform auditory scene recognition in order to associate a particular event with a particular sound in the ambient sounds. In one embodiment, the audio processing system may determine if one sound matches a predefined sound. As discussed in FIG. 3, the audio processing module may evaluate the characteristics of the ambient sounds (frequency, amplitude, repetitive patterns, etc.) to identify a particular sound within the audio. If the detected characteristics match the known characteristics, the audio processing module may identify the events associated with the different sounds—e.g., a bouncing basketball, a chirping bird, moving bicycles, etc.

Once an external event is identified, at block 620, the audio processing module determines whether the modules is currently set in the alerting mode—i.e., if the alerting mode is active. The mode may be set by the occupant or be set based on predefined criteria. For example, the occupant may have her window rolled down and does not need (or want) the audio processing module to play back the identified ambient sounds. In other embodiments, the audio processing module may activate or deactivate the alert mode automatically—i.e., without user input. For example, the audio processing system may include an audio detector in the interior of the car that determines how much the environmental sounds are attenuated by the vehicle. If the environmental sounds are still detectable by the occupant (without any play back), the audio processing module may deactivate its alert mode. For example, a siren of an emergency vehicle may be loud enough to penetrate the vehicle's interior, and thus, the audio processing module may automatically deactivate its alert mode.

If the alert mode is not active, method 600 may return to block 605 to continue to filter the ambient sounds. However, if the alert mode is active, method 600 may advance to, e.g., block 405 of FIG. 4 to determine how to provide the alert to the occupant. For brevity, the details of FIG. 4 will not be repeated here. Generally, method 600 may combined with any technique for providing the alert to the occupants of the vehicle.

At block 615, the audio processing module filters the detected audio to identify a continuous sound that is suitable as a masking sound. As described above, the continuous sound may be any repetitive and/or constant sound that is suitable for masking other sounds. Examples of continuous sounds include rain, noise from tires and engines, wind, and the like. The audio processing module may monitor the ambient sounds to identify particular sounds with attributes that indicate the sound is a continuous sound—e.g., a repetitive pattern, constant amplitude, type of frequencies, and the like. If the sound matches these predefined attributes, the module may categorize the sound as a continuous sound. The audio processing module may then use the continuous sound to create one or more privacy zones.

At block 625, the audio processing module may determine if it is currently in the masking mode. If the masking mode of the audio processing module is not active, method 600 may return to block 605 to continue to filter the ambient sounds. However, if the masking mode is active, the audio processing module provides a masking sound to an occupant based on the identified continuous sound. For example, method 600 may advance to block 515 of FIG. 5 where the continuous sound is processed and played back to the occupant as discussed above.

Method 600 illustrates that the audio processing module may be in both the alerting mode and masking mode simultaneously—i.e., the module may provide an alert and a masking sound in parallel using the speakers in the vehicle. Accordingly, the audio processing module may filter the ambient sounds to identify external events as well as continuous sounds. Of course, a detected sound may be both a continuous sound and an indication of an external event. For example, while on an interstate, the sounds made by a car that is the blind spot of the vehicle may be the basis for generating an alert as well as a masking sound. Moreover, the alert and masking sounds can be intended for the same occupant or different occupants in the vehicle. For example, the audio processing module may use speakers that are closest to the driver for providing the alert but use other speakers to create a privacy zone around a passenger using the masking sound.

In another embodiment, the alerting mode and masking mode may be mutually exclusive in that the audio processing module may be only in one of the modes, but not both, at any given time. In this case, method 600 may be altered such that the audio processing module selectively chooses, based on its current mode, between filtering the ambient sounds to identify external events as shown in block 610 and filtering the audio to identify a continuous sound as shown in block 615.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium, for example, that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access other processing modules or new relevant events or continuous sounds (e.g., events or sounds added by other audio process modules) or related data available in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A vehicular audio system comprising:
an audio detector configured to sense ambient sounds external to a vehicle; and
an audio processing module configured to:
receive one or more signals representing the ambient sounds from the audio detector,
process the ambient sounds to identify an event external to the vehicle and corresponding to at least one sound within the ambient sounds, wherein the at least one sound is generated by the event, and
based on determining that a current speed of the vehicle is above a threshold speed, output the at least one sound via a speaker configured to output sound into an interior of the vehicle, or
based on determining that the current speed is below the threshold speed, output a spoken description of the event via the speaker.

2. The vehicular audio system of claim 1, wherein identifying the event comprises:
comparing the at least one sound in the ambient sounds with predefined sounds each having a predefined association with a respective event, and
upon determining the at least one sound substantially matches one of the predefined sounds, correlating the at least one sound to the respective event associated with the matched predefined sound.

3. The vehicular audio system of claim 1, wherein outputting the at least one sound comprises:
processing the at least one sound to change a characteristic of the at least one sound, and
outputting the processed sound via the speaker.

4. The vehicular audio system of claim 1, wherein the audio processing module is further configured to:
process the ambient sounds to identify a continuous sound within the ambient sounds;
process the continuous sound into a masking sound; and
provide the masking sound using a speaker configured to output sound into an interior of the vehicle to generate a privacy zone within the interior of the vehicle.

5. The vehicular audio system of claim 1, wherein the audio processing module is further configured to:
determine at least one of a distance and a direction of the event relative to the vehicle based on the at least one sound within the ambient sounds, wherein the at least one sound or the spoken description of the event is provided in manner to convey the direction or the distance of the event to an occupant in the vehicle.

6. A method for processing ambient sounds external to a vehicle, the method comprising:
receiving one or more signals representing the ambient sounds;
processing the ambient sounds to identify a plurality of events corresponding to a plurality of sounds within the ambient sounds;
assigning a weight to each of the events based on predefined criteria;
selecting one or more of the sounds to output to an occupant in the vehicle based on the weights assigned to each event;
modifying at least one auditory characteristic of the one or more sounds to enhance the ability of an occupant in the vehicle to identify the event associated with the one or more sounds; and
outputting the modified sound via a speaker in an interior of the vehicle.

7. The method of claim 6, further comprising:
comparing at least one sound in the ambient sounds with predefined sounds, and
upon determining the at least one sound substantially matches one of the predefined sounds, correlating the at least one sound to the event associated with the matched predefined sound.

8. The method of claim 6, wherein the modified sound is an alert to indicate to the occupant that the event is proximate to the vehicle.

9. The method of claim 6, further comprising:
processing the ambient sounds to identify a continuous sound within the ambient sounds;
processing the continuous sound into a masking sound; and
providing the masking sound using the speaker to generate a privacy zone within the interior of the vehicle.

10. The method of claim 6, wherein modifying the one or more sounds includes at least one of sharpening the one or more sounds and amplifying the one or more sounds.

11. The method of claim 6, further comprising:
selecting at least two of the sounds to output to the occupant; and
modifying the characteristics of the two sounds differently based on the assigned weights.

12. A non-transitory computer-readable storage medium including instructions that, when executed by a processor, configure the processor to perform the steps of:
sensing, via an audio detector, ambient sounds external to a vehicle;
receiving one or more signals representing the ambient sounds from the audio detector;
processing the ambient sounds to identify an event external to the vehicle and corresponding to at least one sound within the ambient sounds, wherein the at least one sound is generated by the event; and based on determining that a current speed of the vehicle is above a threshold speed, outputting the at least one sound via a speaker configured to output sound into an interior of the vehicle, or based on determining that the current speed is below the threshold speed, outputting a spoken description of the event via the speaker.

13. A non-transitory computer-readable storage medium including instructions that, when executed by a processor, configure the processor to process ambient sounds external to a vehicle by performing the steps of:

receiving one or more signals representing the ambient sounds;

processing the ambient sounds to identify a plurality of events corresponding to a plurality of sounds within the ambient sounds;

assigning a weight to each of the events based on predefined criteria;

selecting one or more of the sounds to output to an occupant in the vehicle based on the weights assigned to each event;

modifying at least one auditory characteristic of the one or more sounds to enhance the ability of an occupant in the vehicle to identify the event associated with the one or more sounds; and outputting the modified sound via a speaker in an interior of the vehicle.

\* \* \* \* \*